US012321328B2

United States Patent
Sen et al.

(10) Patent No.: US 12,321,328 B2
(45) Date of Patent: Jun. 3, 2025

(54) AUTONOMOUS TABLE PARTITION MANAGEMENT

(71) Applicant: Rubrik, Inc., Palo Alto, CA (US)

(72) Inventors: Rajorshi Kumar Sen, Redmond, WA (US); Gabriel Adrian Lam, Mercer Island, WA (US); Travis Willem Morrissey, Pleasanton, CA (US); Manjunath Chinni, Saratoga, CA (US)

(73) Assignee: Rubrik, Inc., Palo Alto, CA (US)

( * ) Notice: Subject to any disclaimer, the term of this patent is extended or adjusted under 35 U.S.C. 154(b) by 35 days.

(21) Appl. No.: 18/341,575

(22) Filed: Jun. 26, 2023

(65) Prior Publication Data
US 2024/0427754 A1 Dec. 26, 2024

(51) Int. Cl.
| | |
|---|---|
| *G06F 16/20* | (2019.01) |
| *G06F 11/14* | (2006.01) |
| *G06F 16/11* | (2019.01) |
| *G06F 16/22* | (2019.01) |
| *G06F 16/2453* | (2019.01) |

(52) U.S. Cl.
CPC ...... *G06F 16/2282* (2019.01); *G06F 11/1402* (2013.01); *G06F 16/125* (2019.01); *G06F 16/2453* (2019.01)

(58) Field of Classification Search
None
See application file for complete search history.

(56) References Cited

U.S. PATENT DOCUMENTS

| | | | | |
|---|---|---|---|---|
| 9,499,443 | B2 * | 11/2016 | Foret | B01J 4/002 |
| 11,075,984 | B1 * | 7/2021 | Mercier | H04L 43/20 |
| 12,072,868 | B1 * | 8/2024 | Opincariu | G06F 16/2379 |
| 2015/0269239 | A1 * | 9/2015 | Swift | G06F 16/27 707/610 |
| 2017/0142442 | A1 * | 5/2017 | Tsukuba | H04N 19/96 |
| 2018/0322017 | A1 * | 11/2018 | Maccanti | G06F 11/1458 |
| 2022/0004462 | A1 * | 1/2022 | Vig | G06F 16/2477 |

\* cited by examiner

*Primary Examiner* — Belix M Ortiz Ditren
(74) *Attorney, Agent, or Firm* — Holland & Hart LLP

(57) ABSTRACT

Methods, systems, and devices for data management are described. A database instance associated with managing data of one or more users may be generated. In the database instance, a table of a database for a user of the one or more users may be generated. The table may be configured to store metadata for managing data of the user and may include a partitioning category. Based on generating the table, a file that indicates a policy for partitioning the table and for retaining partitions in the table may be identified. The policy may be based on a data retention policy associated with the data of the user. Based on identifying the file, partitions for the table may be generated in accordance with the partitioning category and the file, and based on generating the partitions, one or more partitions of the partitions may be deleted in accordance with the file.

19 Claims, 8 Drawing Sheets

Current Day: 0; Left: Past Days; Right: Following Days

AUTONOMOUS TABLE PARTITION MANAGEMENT

FIELD OF TECHNOLOGY

The present disclosure relates generally to data management, including techniques for autonomous table partition management.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Metadata that supports the operation of data protection services offered by a data management system to one or more customers may be stored in one or more databases. In some examples, the metadata may be stored in a corresponding table in the database. To conserve storage resources, rows of a table that store expired metadata may be deleted. In some examples, the expired rows may be identified and deleted on a row-by-row basis—e.g., based on timing information included in the row and a retention policy designated by the customer.

But searching for and deleting expired metadata on a row-by-row basis may consume excessive processing resources and may take excessive amounts of time. Also, operations for a table (e.g., queries) may be degraded while a row-by-row clean-up operation is performed for the table. Moreover, deleting expired metadata from a table on a row-by-row basis may result in increased disk fragmentation as rows including valid metadata and rows including expired metadata may be stored in a same memory page, which may increase a duration associated with scanning the rows. Additionally, as metadata expires, a table may become fragmented, and a latency of queries for the table may increase. In some examples, to improve database performance, instructions for clean-up and querying operations may be written and optimized on a table-by-table basis, which may require significant and specific developer effort to be spent for each table. Thus, techniques and configurations that support efficient database operation in the face of ongoing and significant row expiration and that may be generally applied across all tables of a database may be desired.

To support efficient operation for databases with constantly expiring rows that is generally applicable to tables in a database, table partitioning techniques and files that declare a partition generation/retention policy (which may be referred to as a "policy file") for respective tables may be used. The policy file may include one or more partitioning parameters for generating and deleting partitions. In some examples, a policy file for a table may be generated based on data retention requirement of a customer, a data object associated with the table, or a combination thereof. For example, the policy file may indicate a one or more criteria (e.g., a time interval) for including data within a partition as well as a quantity of partitions to retain such that large amounts of expired data (e.g., data protection metadata) may be deleted in a single operation for deleting a partition while the remaining partitions store the unexpired data.

Figure 1:
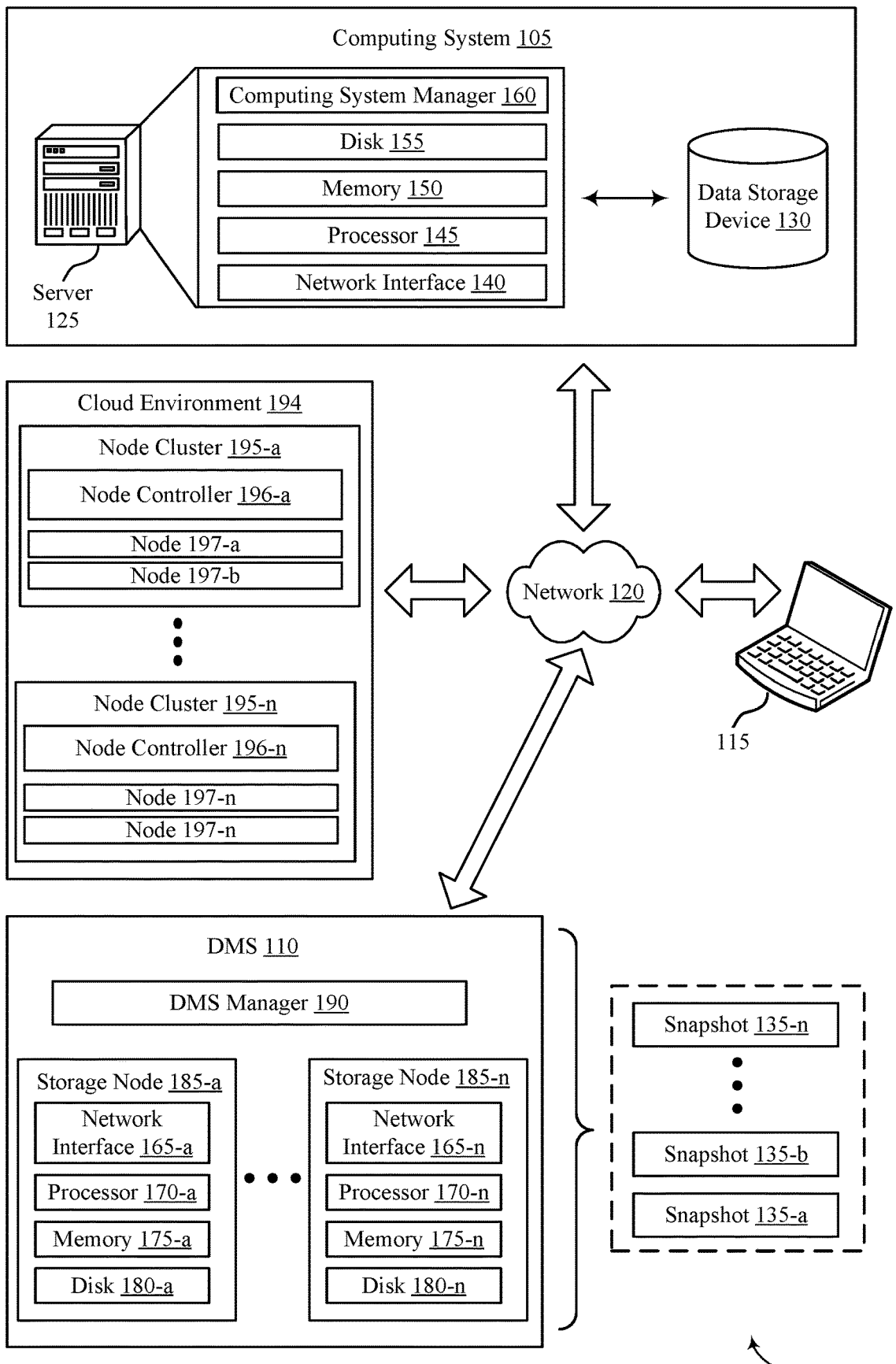
FIG. 1 shows an example of a computing environment that supports autonomous table partition management in accordance with aspects of the present disclosure.

FIG. 1 shows an example of a computing environment 100 that supports autonomous table partition management in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random-access memory (SRAM), dynamic random-access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though shown as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example shown in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105.

And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In the DMS 110, the control-plane may be common to multiple customers/tenants, where each customer/tenant may have a private data-plane. For example, as described herein, the DMS 110 may transfer snapshots 135 via the network 120 to a cloud environment 194, where each customer/tenant may have a private cloud environment (e.g., Microsoft Azure) which includes a node cluster 195 across which customer or tenant data is stored. Each node cluster 195 may include a node controller 196 which manages the nodes 197 of the node cluster 195. Separating each customer/tenant's data into separate node clusters 195 provides fault isolation for the different customers/tenants and provides security by limiting access to data for each customer/tenant. Node clusters 195 may be hosted externally (e.g., on one or more external cloud environments, such as Microsoft Azure). The control-plane (e.g., the DMS, and specifically the DMS manager 190) may manage tasks, such as storing backups or snapshots or performing restorations, across the multiple node clusters 195.

The DMS 110 may operate one or more database instances that support the functions (e.g., the data protection services) of the DMS 110. For example, the one or more database instances may be used to store metadata that supports protecting the data of one or more customers (e.g., protecting the data of the computing system 105). In some examples, the DMS 110 may operate a first database instance that includes multiple databases for one or more customers. In some examples, each database may be associated with a respective customer, a respective data object (e.g., a physical machine, VM, VCenter, database, file system, etc.), or a combination thereof.

For example, the DMS 110 may protect data owned by a particular customer—e.g., the DMS 110 may create backups for, create snapshots for, and/or provide security analysis for the data owned by the customer. To support the protection of the data owned by the customer (which may be referred to as "customer data"), the DMS 110 may store, in a table of a first database, metadata associated with the protection of the customer data. For instance, to support a snapshot service for the customer data, in addition to a snapshot taken for the customer data, the DMS 110 may store information about the snapshot, such as when the snapshot was taken, a data object the snapshot was taken for, a retention duration for the snapshot, an expiration date for the snapshot, etc.

In some examples, protection for customer data (e.g., protection for prior versions of the customer data that are protected by the DMS 110) expires—e.g., in accordance with an expiration duration, a retention policy, etc. For example, a snapshot protecting a version of the customer data may expire if a threshold amount of time has elapsed since the snapshot was taken, if a threshold quantity of snapshots protecting the customer data have been taken and the snapshot is the oldest snapshot, if (for a given time period) a threshold quantity of snapshots protection the customer data have been taken and the snapshot is the oldest snapshot in the given time period, and the like. In such cases, when the snapshot protection for a version of the customer data expires, the metadata (for the snapshot) stored in a table of database may expire with it. That said, after expiration, the metadata may remain stored in the table of the database until a clean-up operation is performed to remove the metadata from the table. Accordingly, over time (as additional snapshots expire), the table used to store the customer data may begin to store significant amounts of expired metadata.

To conserve storage resources, the DMS 110 (e.g., a database manager in the DMS 110) may delete rows of the table that store expired metadata. In some examples, to delete the expired metadata, the DMS 110 scans (on a row-by-row basis) for rows that store expired metadata (e.g., based on timing information included in the row and a retention policy for the customer data) and deletes (on a row-by-row basis) rows that are determined as storing expired metadata.

But searching for and deleting expired metadata on a row-by-row basis may consume excessive processing resources and may take excessive amounts of time (e.g., for large tables, such as tables that store hundreds of gigabytes of data). Moreover, after deletion, the memory may become fragmented and the rows of the table may become sparse (rather than dense), which may increase a duration for scanning the rows of the table. In some examples, operations for a table (e.g., queries) may be degraded while a row-by-row clean-up operation is performed for the table. Moreover, deleting expired metadata from a table on a row-by-row basis may result in increased disk fragmentation as rows including valid metadata and rows including expired metadata may be stored in a same memory page. Additionally, as metadata expires, a table may become fragmented, and a latency of queries for the table may increase. In some examples, to improve database performance, instructions for clean-up and querying operations may be written and optimized on a table-by-table basis, which may require significant and specific developer effort to be spent for each table. Thus, techniques and configurations that support efficient database operation in the face of ongoing and significant row expiration and that may be generally applied across all tables of a database may be desired.

To support efficient operation for databases with constantly expiring rows that is generally applicable to tables in a database, table partitioning techniques and files that declare a partition generation/retention policy (which may be referred to as a "policy file") for respective tables may be used. The policy file may include one or more partitioning parameters for generating and deleting partitions. In some examples, a policy file for a table may be generated based on a data retention requirement of a customer, a data object associated with the table, or a combination thereof. For example, the policy file may indicate one or more criteria (e.g., a time interval) for including data within a partition as well as a quantity of partitions to retain such that large amounts of expired data (e.g., data protection metadata) may be deleted in a single operation for deleting a partition while the remaining partitions store the unexpired data.

In some examples, the DMS 110 may generate a database associated with managing data of one or more customers. For example, the database may be associated with taking snapshots of the data for the multiple customers. The database may be associated with taking backups of the data for the multiple customers. The database may be associated with security analysis of the data for the multiple customers, or any combination thereof. In some examples, the DMS 110 may generate multiple databases associated with managing data (e.g., different types of data) of the multiple customers. The DMS 110 may also generate a table in the database, where the table may be for a customer of the multiple customers and may be used to store metadata for managing data (e.g., one or more data objects) of the customer. In some examples, the table may also support partitioning and one or more partitioning categories (e.g., snapshot creation time, a snapshot expiration time, a snapshot retention duration, etc.) may be designated for the table. In some cases, the DMS 110 may use Boolean logic (e.g., user-defined logic, as defined by a user of the DMS 110) to implement partitioning based on one or more partitioning categories (e.g., to support partitioning based on logical AND, logical OR, or other logical relationships between or across multiple partitioning categories).

Based on generating the table, the DMS 110 may identify a policy file that indicates a policy for partitioning the table and for retaining partitions in the table (which may be referred to a as a "partition management policy"). In some examples, the policy is based on a data retention policy associated with the data of the customer—e.g., based on a policy of the customer for retaining captured versions of the data of the customer prior to deletion. In some examples, the policy file indicates a time interval for partitions of the table, where metadata having time-based data that falls within a certain time interval designated to a partition may be included in the partition. The policy file may also indicate a quantity of partitions of the table to retain. In some examples, a value of the quantity of partitions is based on the time interval of the partitions and the data retention policy of the customer—e.g., the value of the quantity of partitions is selected such that metadata is only deleted after corresponding versions of the customer data are no longer expected to be retained by a service level agreement with the customer. In some examples, one or more additional criteria may also be used to determine whether to retain or delete a partition, such as if all data in the partition is older than a certain date or if all entries within a particular column in the partition have identical values.

In accordance with the partitioning category and the policy file, the DMS 110 may autonomously generate partitions for the table. Additionally, based on generating the partitions for the table, the DMS 110 may delete partitions for the table in accordance with the policy file—e.g., the DMS 110 may delete the oldest partitions that expire as the quantity of partitions for the table exceeds the quantity of partitions to retain indicated in the policy file. In some examples, deleting a partition of the table may be executed with a single partition delete operation.

By partitioning tables in a database used to protect customer data based on timing information of data protection metadata that is associated with a retention policy of a customer, operations for identifying and deleting expiring data protection metadata may be simplified—e.g., as entire partitions of expired data protection metadata may be deleted in a single operation. Also, by using policy files that include parameters for governing the generation and deletion of partitions in accordance with data retention policies, partitions storing data protection metadata may generated autonomously and partitions storing expired data protection metadata may be removed autonomously.

Although discussed in the context of a database that stores metadata for data protection services, it is worth noting that the concepts described herein may be similarly applied to databases that store data for other types of services (e.g., other types of services that have constantly expiring data or data for which the metadata constantly expires).

Figure 2:
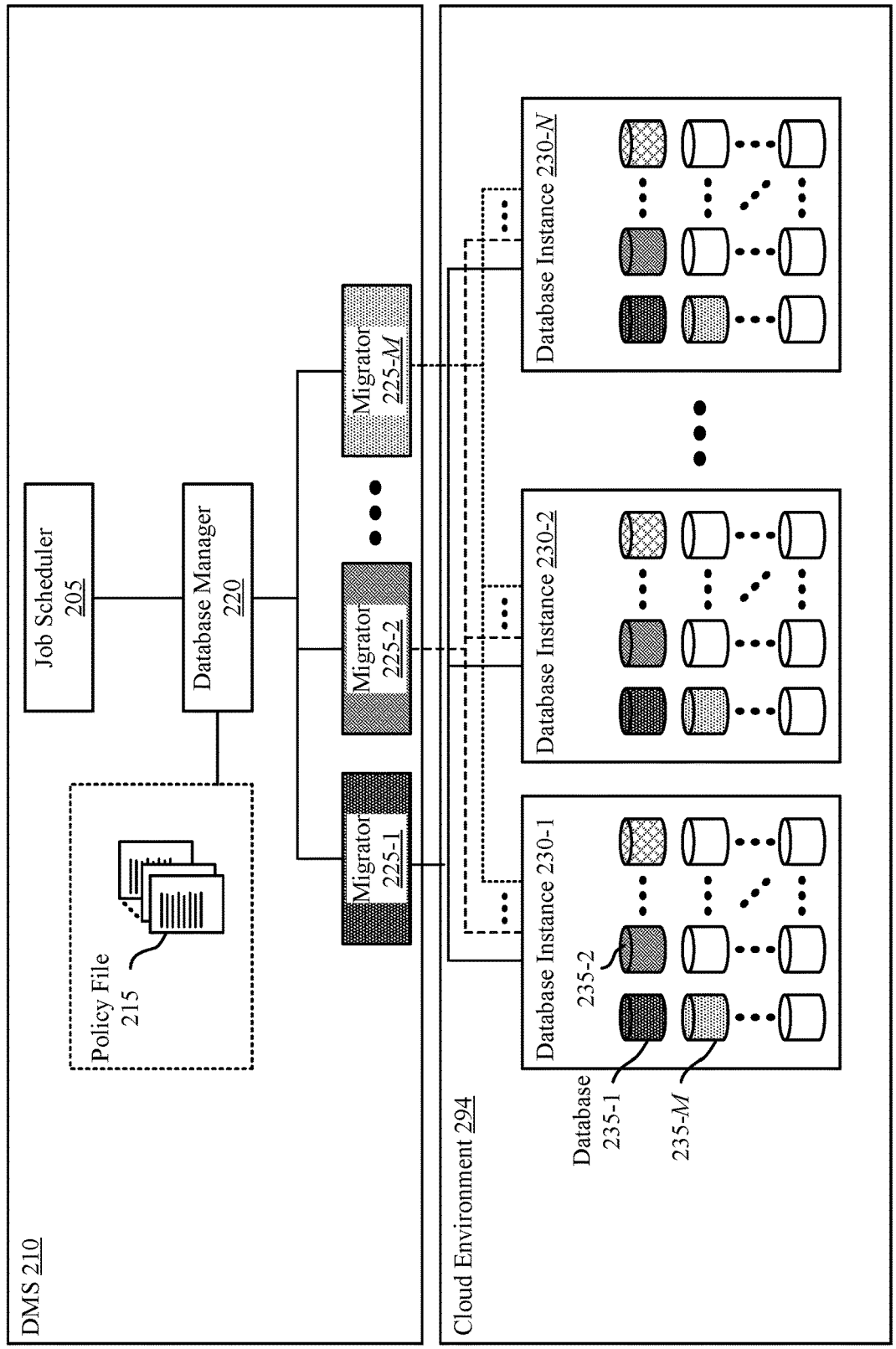
FIG. 2 shows an example of a subsystem that supports autonomous table partition management in accordance with aspects of the present disclosure.

FIG. 2 shows an example of a subsystem that supports autonomous table partition management in accordance with aspects of the present disclosure.

The subsystem 200 may include the DMS 210, which may be an example of a DMS described herein (e.g., the DMS 110 of FIG. 1), and the cloud environment 294, which may be an example of a cloud environment described herein (e.g., the cloud environment 194 of FIG. 1). The DMS 210 may include the job scheduler 205, the database manager 220, and the migrators 225, and may store policy files, such as the policy file 215. The cloud environment 294 may include the database instances 230 and the databases 235.

The job scheduler 205 may be configured to schedule the execution of jobs within the DMS 210. The job scheduler 205 may schedule data protection jobs, data clean-up jobs, software management jobs, database management jobs, cluster management jobs, and the like.

The database manager 220 may be configured to manage the databases supported by the DMS 210. In some examples, the database manager 220 is configured to keep track of each database in the DMS 210. The database manager 220 may also be configured to maintain a record of which server each database is on. The database manager 220 may additionally be configured to generate and delete database instances and databases in the DMS 210. In some examples, the database manager 220 may be configured to communicate with the migrators 225, and all database related matters (e.g., queries, tasks, migrations) may flow through (e.g., be received at and coordinated by) the database manager 220.

The database instances 230 may be configured to implement databases (e.g., the databases 235) for multiple customers. In some examples, each of the databases is allocated to a respective customer. For example, the first database 235-1 in the first database instance 230-1 may be allocated to a first customer, the second database 235-2 in the first database instance 230-1 may be allocated to a second customer, and so on. In some examples, the first database instance 230-1 may also include a database that includes non-customer related tables, such as customer-to-database mappings, job tables, etc.

Also, each of the databases may include a respective set of tables used to support a function (which may also be referred to as a service component) of the DMS that supports a data management service provided to the respective customer. For example, each of the databases 235 may include one or more tables associated with a global positioning system (GPS) component of, one or more tables associated with a cloud computing component, one or more tables associated with a cloud storage component of, one or more tables associated with a data protection component, one or more tables associated with a data security component, and so on. In some examples, each of the databases within a database instance includes the same sets of tables, though each of the databases may store different data. Among other database implementations, the databases may be implemented as Cloud SQL databases, SQL databases, NoSQL databases, or a combination thereof.

The migrators 225 may be configured to perform operations for migrating objects of the databases (database objects, such as tables, indices, and views) from one form to another—e.g., to support changes in an application, to implement bug fixes, as a result of a system redesign, etc. As an example of changing the form of a table, the migrators 225 may be configured to add one or more partitions to the table, drop one or more partitions from the table, or both.

In some examples, each of the migrators 225 may be configured to process respective types of data objects. For example, one migrator (e.g., the first migrator 225-1) may be designated to process data objects that support a GPS application, another migrator (e.g., the second migrator 225-2) may be designated to process data objects that support a cloud computing application, another migrator may be configured to process data objects that support a cloud storage application, and so on. In other words, each of the migrators 225 may be configured to support the operation of different service components (e.g., a GPS component, a cloud computing component, a cloud storage component, etc.).

In some examples, the database manager 220 controls the operation of the migrators 225. For example, the database manager 220 may be configured to initiate one migrator for each of the service components in each of the database instances 230. For example, the database manager 220 may be configured to initiate a GPS component migrator (e.g., the first migrator 225-1), a cloud computing migrator (e.g., the second migrator 225-2), and a cloud storage migrator in the first database instance 230-1, and so on.

In some examples, each of the migrators 225 is configured to execute migration operations (e.g., partition management) for tables associated with a same application as a respective migrator. For example, a GPS component migrator may be configured to execute migration operations for GPS tables in each of the databases within each of the database instances 230. In some examples, the migrators 225 may be configured (e.g., by the database manager 220) to process one table at a time within a respective database instance. In other examples, the migrators 225 may be configured to process multiple tables at a time within a respective database instance—e.g., based on a tunable thread pool limit that determines how many tables for which a migrator can concurrently execute migration operations.

As noted above, each the databases 235 may include sets of tables used to support different service components. In some examples, one or more of the tables supports table partitioning and may, thus, be separated into multiple partitions—e.g., based on a partitioning category. In some examples, the partitioning category for the table is designated when the table is generated and corresponds to one or more categories (columns) associated with data (rows) stored in the table.

The policy files may be configured to govern the generation and deletion of partitions in respective tables. In some examples, the policy files may be configured based on a retention policy for customer data associated with respective tables such that expired data (that falls outside of a customer retention period) in a table is grouped into one or more partitions and nonexpired data (that is within the customer retention period) in the table is grouped into the other partitions. One or more criteria may also be used to determine whether to retain or delete a partition (e.g., if all data in the partition is older than a certain date or if all entries within a particular column in the partition have identical values.)

In some examples, the policy files may indicate a time interval for partitioning (e.g., one or more hours, days, weeks, month, etc.) respective tables. In such cases, the table partitions may store rows having time-based data (e.g., corresponding to the partitioning category) that falls within respective time intervals of the indicated length. The time-based data may include creation date/time (e.g., snapshot creation time, backup creation time, etc.), an expiration date/time (e.g., snapshot expiration time, backup expiration time, etc.), a retention duration, and the like.

In some examples, the policy files may indicate non-time-based criteria for partitioning respective tables, where the non-time-based criteria may indicate whether corresponding data has expired. In such cases, the table partitions may store rows having non-time-based data (e.g., corresponding to the partitioning category) that is categorized under the partitioning category. The non-time based data may include ordered data, such as a serialized numeric value (e.g., which may correspond to a date, an creation index, etc.). The non-time based data may include a data type or status (e.g., whether a snapshot/backup is protected, whether a snapshot/backup is duplicative of an initial snapshot taken within a duration, whether a snapshot/backup is quarantined, whether a snapshot/backup is identified as anomalous, etc.). For example, data stored in a partition used to store metadata for duplicative snapshots taken with a duration may expire in accordance with a retention policy of a user—e.g., that requests one snapshot be stored for the duration.

The policy files may also indicate a quantity of partitions to retain for the respective tables. In some examples, the quantity of partitions to retain for a table is determined based on the partitioning interval for the table and a data retention policy for customer data associated with the table to ensure that nonexpired data in the table is not prematurely deleted. The policy files may also indicate a database type (e.g., a customer database), a name of the table, and an indication of whether partitioning is to be applied to the table.

In some examples, the policy files are implemented using Go code and can be used to provide additional conditions that govern the generation and deletion of table partitions. For example, the policy file may indicate multiple partitioning criteria (e.g., a time-based criterion, creation time, and a non-time-based criterion, quarantine status) and may designate different partition expiration policies for different partitions. For instance, the policy file may indicate an increased retention duration for a partition that stores rows of metadata that indicate a creation time within a partitioning interval and that indicate a quarantined status-relative to a partition that stores rows of metadata that indicate a creation time within a partitioning interval and that indicate a non-quarantined status. Accordingly, policy files may be used to generate different types of partitions that have different retention policies based on user preferences, system preferences, or both. In some examples, the policy files may be included in a code base that is stored separate from, but accessible to, the database manager 220. For example, the policy files associated with a particular migrator may be stored at an example location/system/src/company/<component>/migrator/partitions, and an example policy file name may be p0001-xxx_table. In some cases, the policy files may use Boolean logic (e.g., user-defined logic, as defined by a user of the DMS 210) to implement partitioning based on one or more partitioning categories (e.g., to support partitioning based on logical AND, logical OR, or other logical relationships between or across multiple partitioning categories).

An example policy file may be implemented as follows:

```
package schema
import (
   "context"
   "source/common-go/migrator/actions"
   "source/common-go/migrator/actions"
)
func (*PlatformMigrations) PTestTable(
   ctx context.Context,
) *actions.Partition Policy{
   p := &actions.PartitionPolicy{
      DatabaseType:            actions.CustomerDatabase,
      Table:                   "test_table",
      RetentionUnits:          3,
      PartitionInterval:       actions.Month
      PartitionKeyType:        datatypes.DatetimeType,
      BufferUnits:             5,
      BufferAlertThreshold:    3,
      RetentionAlertThreshold: 6,
      Enabled:                 true,
      EnabledDate:             yyyy-mm-dd,
   }
   return p
}
```

In some examples, the database manager 220 may use the migrators 225 to execute the policies set for one or more of the tables identified in the policy files. In some examples, the database manager 220 may direct the migrators 225 to execute the policies set for one or more of the tables after receiving a request from the job scheduler 205 to perform partition management for the tables. In some examples, the database manager 220 may direct the migrators 225 to execute the policies in accordance with a partition management schedule. For example, the database manager 220 may direct the migrators 225 to execute the policies during partition management windows (during which partitions may be generated, dropped, or both). In some examples, partition deletion is scheduled during a first set of partition management windows (which may be referred to as "partition deletion windows") and partition generation is scheduled during a second set of partition management windows (which may be referred to as "partition generation windows").

In some examples, a global partition management schedule may be designated for the database instances 230. Additionally, or alternatively, local partition management schedules may be designated to individual databases of the database instances 230. Additionally, or alternatively, local partition management schedules may be designated to individual tables of the databases 235.

In some examples, one or more partition management windows of a partition management schedule (e.g., a global partition management schedule or a local partition management schedule) may be canceled. For example, partition deletion windows (e.g., a global partition deletion windows or local partition deletion windows) may be canceled to increase retention time for a period of time or to prevent data loss during an investigatory period. In some examples, local partition deletion windows may be canceled on a customer-level—e.g., during a period of time when a customer requests additional data retention.

Based on receiving the request from the job scheduler 205, the database manager 220 may direct the first migrator 225-1 to execute the policy file 215 for a first table in a first database (e.g., the first database 235-1). In some examples, the first migrator 225-1 and the first table in the first database 235-1 are associated with a first service component supported by the DMS 210 (e.g., a GPS component, a data protection component, a data security component, etc.)

In response, the first migrator 225-1 may generate one or more partitions for the first table of the first database 235-1 in accordance with the policy file 215. For example, if the policy file 215 indicates a partitioning interval of one month and an indication to retain three partitions (which may be referred to as "retention units"), the first migrator 225-1 may generate a first partition that spans a first month, a second partition that spans a second month, and a third partition that spans a third month. The first migrator 225-1 may further distribute the rows of the first table of the first database 235-1 into the partitions based on one or more partitioning categories designated for the first table of the first database 235-1. For example, if a snapshot creation time is designated as the partitioning category, the first table of the first database 235-1 may store, in the first partition, the rows associated with a snapshot creation time during the first month; in the second partition, the rows associated with a snapshot creation time during the second month; and in the third partition, the rows associated with a snapshot creation time during the third month. In some examples, storing three months of data protection metadata may ensure that data protection metadata is not deleted from the first table of the first database 235-1 while the corresponding customer data is assigned to be protected by a customer retention policy.

In some examples, a catch-all partition may also be generated for the first table of the first database 235-1—e.g., when the first table of the first database 235-1 is created. In such cases, any rows associated with a snapshot creation time outside the first three months may be stored in the catch-all partition. In some examples, the catch-all partition may be generated at a time when the first table of the first database 235-1 is initially generated. That is, the generation of the catch-all partition may be excluded from partition generation and partition dropping operations that are performed in accordance with a policy file for the first table of the first database 235-1.

In some examples, as part of a partition management job, the migrators 225 may generate one or more buffer partitions for the tables ahead of schedule to prevent table restructuring (e.g., migration of data from the catch-all partition) in accordance with the policy files. For example, the first migrator 225-1 may also generate a buffer partition for the first table of the first database 235-1 in accordance with the policy file 215 and may store, in the buffer partition, the rows associated with a snapshot creation time during the fourth month.

In addition to generating partitions, the first migrator 225-1 may also be configured to delete one or more partitions for tables in accordance with the policy files. For example, the first migrator 225-2 may be configured to delete one or more partitions of the first table of the first database 235-1 in accordance with the policy file 215. For example, the first migrator 225-1 may be configured to delete a partition based on determining that the quantity of partitions for the first table 235-1 exceeds the quantity of retention units. In such cases, the data protection metadata stored in the partition to be deleted may be expired. In some examples, the buffer partitions and/or catch-all partition are not included in the determination of whether the quantity of partitions for the first table 235-1 exceeds the quantity of retention units.

In response to the command received from the database manager, the first migrator 225-1 may similarly perform table partition management operations for the first table of the first database in each of the databases 230. Also, based on receiving the request from the job scheduler 205, the database manager 220 may similarly direct the remaining migrators to execute additional policy files for respective tables of the database 235.

In some examples, the database manager 220 may initiate separate partition management threads for each of the database instances 230 to be executed by each of the migrators 225. To initiate the separate partition management threads, the database manager 220 may group the databases 230 into a set of lists based on the instance in which the databases 230 reside. For each list, the database manager 220 my invoke a partition management procedure for each migrator, where the lists may be used as inputs. For each of the lists received by a migrator, the migrator may create a thread pool of tunable threads for executing partition management for a respective list.

In some examples, based on creating a first thread pool associated with the first database instance 230-1, the first migrator 225-1 may be configured to execute a table partitioning operation for a first table in the first database 235-1 within the first database instance 230-1. As part of the thread pool, the first migrator 225-1 may be further configured to execute a table partitioning operation for a second table in the first database 230-1.

After completing the table partitioning for the first table, a thread in the thread pool may become available, and the first migrator 225-1 may be configured to execute a table partitioning operation for a third table in the first database 230-1, and so on until the partition management has been completed for all of the tables in the first database 230-1 that are associated with the same component as the first migrator 225-1. After completing partition management for all of the associated tables in the first database 230-1, the first migrator 225-1 may proceed to similarly perform partition management for the second database 230-2. In some examples, the first migrator 225-1 may execute partition management for one or more of the last tables within the first database 235-1 concurrently with executing partition management for one or more of the first tables within the second database 235-2.

Also, as part of a second thread pool associated with the second database instance 230-2, the first migrator 225-1 may be configured to execute a table partitioning operation for the first and second tables in the first database of the second database instance 230-2.

In some examples, each of the migrators 225 may support the concurrent execution of threads across thread pools such that the first migrator 225-1 may execute one or more table partitioning operations for the first database 235-1 within the first database instance 230-1, one or more table partitioning operations for another database within the second database instance 230-2, and so on.

In accordance with the concepts described herein, the policy files may provide a declarative and consistent way to autonomously govern the partitioning of the tables 235 on an individual (e.g., customer and/or data object) basis and to autonomously govern the removal of partitions from the tables 235 such that expired metadata is removed from the tables 235 on a partition-by-partition basis. Also, the partition management techniques described herein may be resilient to system failures. That is, a failure of a partition management job for one or more tables may not result in system errors as the tasks of the failed partition management job can be completed when a subsequent partition management job is performed.

Figure 3:
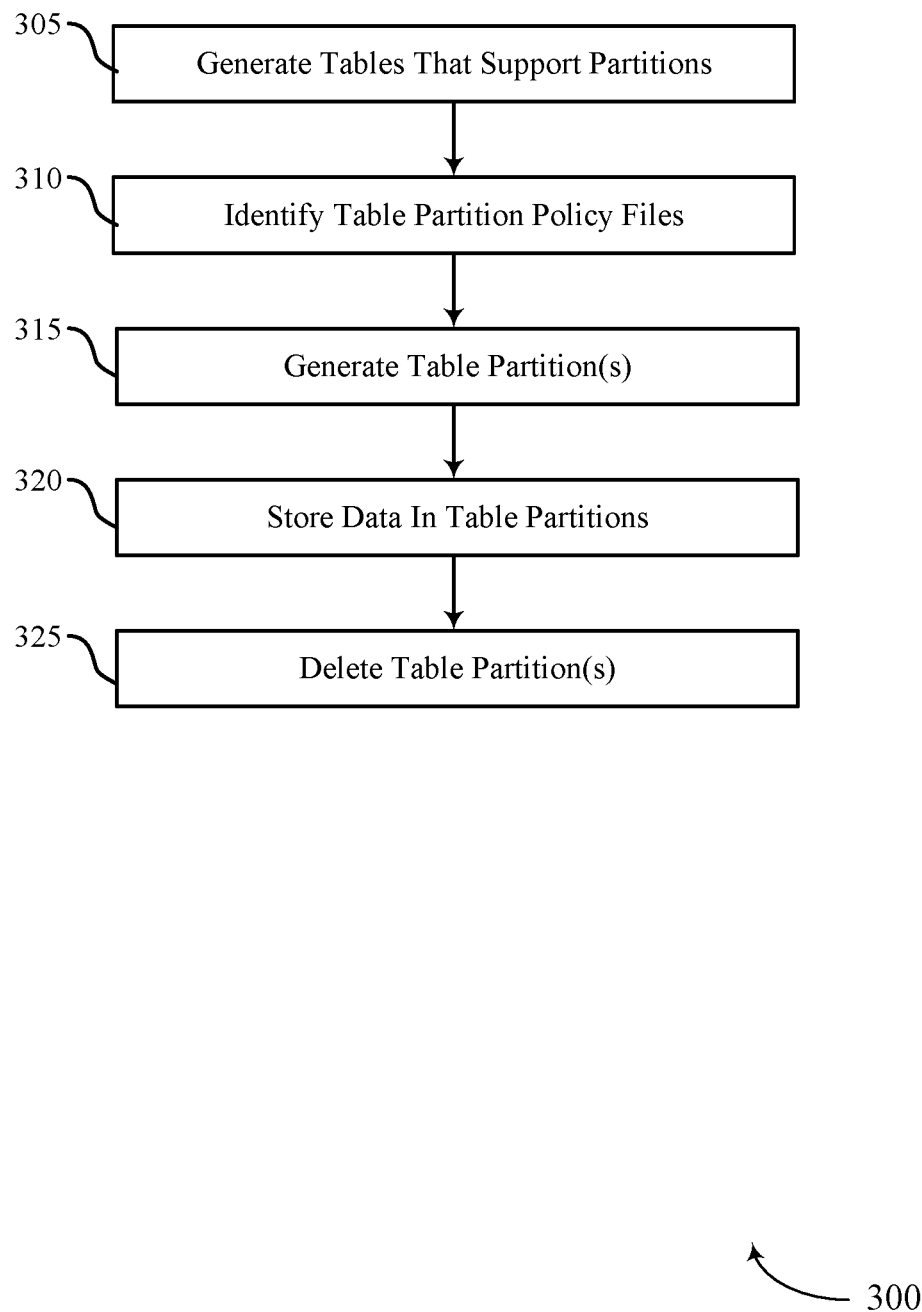
FIG. 3 shows an example of a set of operations for autonomous table partition management in accordance with aspects of the present disclosure.

FIG. 3 shows an example of a set of operations for autonomous table partition management in accordance with aspects of the present disclosure.

The flowchart 300 may be performed by a DMS as described herein (e.g., the DMS 210 of FIG. 2, the DMS 110 of FIG. 1). In some examples, the flowchart 300 shows an example set of operations performed to support autonomous table partition management. For example, the flowchart 300 may include operations for managing (e.g., generating/deleting), in accordance with a policy file, partitions of a table used to store data protection metadata.

At 305, one or more tables may be generated (e.g., by a database manager, such as the database manager 220 of FIG. 2) across one or more databases, where the tables may support partitions. In some examples, the one or more tables are associated with one or more customers, data objects, or a combination thereof. For example, a first table may be used to support data protection operations for the data of a first customer, a second table may be used to support data protection operations of a first data object of a second customer, a third table may be used to support data protection operations of a second object of the second customer, and so on. In some examples, the tables may all be in a same database. In other examples, the first table may be in a first database while the second table and third table may be in a second database.

For tables that support partitioned operation, a partitioning category may be designated. For example, tables that support data protection operations (e.g., and store data protection metadata) may support partitioned operation. In some examples, the partitioning category may be a category that can be used to determine whether stored metadata has expired in accordance with a customer's retention policy. For example, the partitioning category may be a time-based category such as a creation date/time, an expiration date/time, a retention duration, etc. In such cases, a value of the partitioning category for a row may be used to determine whether the row has expired—e.g., based on the time-based parameter and a retention policy for user data corresponding to the row.

In some examples, catch-all partitions may be generated for the tables upon creation. The catch-all partition in a table may be configured to store data that does not fit within any of the existing partitions in the table (e.g., does not have a date that falls within any of the date ranges of the existing partitions).

At 310, table partition policy files (e.g., such as the policy files described with reference to FIG. 2) may be identified (e.g., by the migrators, such as the migrators 225 of FIG. 2) for the generated tables that support partitioned operation. In some examples, the table partition policy files are identified based on table partitioning jobs being scheduled for the tables—e.g., as a result of the tables being generated.

For example, based on a table partitioning job being scheduled for a table and posted to a job queue, the database manager may initiate a thread for performing the table partitioning job and may assign the thread to the migrator. Based on receiving the assignment, the migrator may identify and retrieve a table partitioning policy file for the table. The database manager may similarly initiate one or more threads for each of the migrators in the DMS.

In some examples, the quantity of threads initiated by the database manager may be tunable. For example, the quantity of threads initiated by the database manager may be based on a thread capability of the available migrators (e.g., how many threads a migrator is capable of/configured to execute in parallel for a single database, how many threads a migrator is capable of/configured to execute in parallel across multiple database instances, or a combination thereof), a quantity of database instances, a quantity of databases, a quantity of tables, and a desired completion time for a partition management operation. In some examples, for a first desired completion time, the database manager initiates a greater quantity of threads for the partition management operation than for a longer desired completion time. That is, the database manager may initiate a greater quantity of threads to reduce a time for completing the partition management operation for the first desired completion time. In other examples, for a second desired completion time, the database manager initiates a lesser quantity of threads for the partition management operation than for a shorter desired completion time, which may consume less processing and energy resources.

At 315, table partitions may be generated (e.g., by the migrators) in accordance with the policy files and threads. In some examples, the policy files indicate partitioning parameters for respective tables, such as a partitioning interval (e.g., hours, days, months, years), a quantity of partitions to retain during operation of the table (which may be referred to as a retention unit), a quantity of buffer partitions to generate during operation of the table, and the like. In some examples, the table partitions are generated in accordance with a partition management schedule (e.g., during a partition management window, during a partition generation window).

For example, after obtaining a policy file for a table, a migrator may generate one or more partitions. In some cases, the migrator may determine time ranges for each of the one or more partitions based on the partitioning interval in the policy file and may assign the time ranges to the different partitions. For example, the migrator may assign a first month (e.g., January) to a first partition, a second month (e.g., February) to a second partition, and a third month (e.g., March) to a third partition—e.g., based on a value for the partitioning interval indicating a month as the partitioning interval unit. The migrator may also determine a quantity of partitions to generate based on the retention unit indicated in the policy file. For example, the migrator may generate at least three partitions if the value for the retention unit indicated in the policy file is equal to three. As described herein, the values for the partitioning interval and the retention unit may be determined based on a user's data retention policy for user data protected by the table. That is, the values may be determined such that, once the quantity of partitions exceeds the threshold specified by the retention unit parameter, the excess partition to be deleted will store expired metadata for user data versions for which data retention is no longer expected by the user. For example, if protected user data is expected to be retained for three months, then metadata in the oldest partition (e.g., the partition for January) may expire when a fourth partition is generated and be subject to deletion.

Additionally, or alternatively, the migrators may generate buffer partitions for the tables. Buffer partitions may include partitions that are generated earlier than scheduled to mitigate partitioning failures that may occur during operation. For example, for a table, a buffer partition may be generated for a fourth month (e.g., April) while the three other partitions currently exist in accordance with a policy file that indicates a one (1) month partitioning interval and three (3) retention units. The buffer partitions may prevent data from being stored in the catch-all partition (e.g., by ensuring that data is able to be stored in an appropriate partition associated with a date of the data). In some examples, to reduce an amount of data stored in the catch-all partition, one or more alerts may be configured that indicate if the buffer partitions are insufficient—e.g., if the buffer partitions are not preventing data from being stored in the catch-all partition, if the quantity of existing buffer partitions falls below a threshold. In some examples, one or more alerts may also be configured if the total number of past partitions exceeds a threshold.

In some examples, the table partitioning operation is robust against failures and can be retried multiple times with little or no effect on the operation of the table. For example, if a migrator fails to generate a fourth partition for a fourth partitioning interval (e.g., for April), the rows associated with that partitioning interval may be stored in a buffer partition or, if no buffer partitions are available, in the catch-all partition until the fourth partition is generated.

At 320, based on generating the table partitions, data (e.g., data protection metadata) may be stored (e.g., via the database manager 220) in the table partitions. In some examples, data protection metadata may be stored in the table partitions based on the respective partition intervals of the table partitions and the partitioning category for the table. For example, first data protection metadata (in a first row) may have a first value for the partitioning category (e.g., a snapshot creation date of Apr. 16, 2023) and may be stored in a table partition assigned a partitioning interval (e.g., the snapshot creation date range of Apr. 1, 2023 through Apr. 30, 2023) that includes the value. Second data protection metadata may have a second value falling with the partitioning interval assigned to another table partition and may be stored in the other partition, and so on. In some examples, based on generating the catch-all partitions and/or buffer partitions, data may also be stored in the catch-all partitions and/or buffer partitions.

Over time, partitions in a table that store data may expire—e.g., when a quantity of the partitions (excluding buffer partitions) exceeds a retention unit indicated for the table in a respective policy file. For example, when a quantity of partitions having data from one or more earlier time periods (e.g., past data)—which may be referred to as retention partitions or past days partitions—exceeds the retention unit indicated for the table in the respective policy file, then such excess retention partitions may be eligible for garbage collection or other deletion operations. The excess retention partitions may be referred to as expired retention partitions. Such retention partitions may remain in the table until a deletion operation (e.g., a garbage collection operation) is performed, as part of which any retention partition with expired data may be deleted. In contrast with retention partitions, which may include past data, buffer partitions may in some cases include data from one or more future time periods future data (e.g., future data). Techniques for generating partitions and expiring partitions are described in more detail herein, including with reference to FIGS. 4A and 4B.

At 325, one or more of the table partitions may be deleted (e.g., by the migrators) in accordance with the policy files and threads. In some examples, excess table partitions in tables having respective quantities of table partitions that exceed respective retention units indicated in respective policy files may be deleted. In some examples, the migrators may both generate and delete table partitions as part of executing a single table partitioning thread. In some examples, prior to deletion, the one or more excess table partitions in the table may expire (and may be referred to as "expired table partitions") when the respective quantities of table partitions that exceed respective retention units. In such cases, the one or more expired table partitions may be subsequently deleted (e.g., by the migrators) when a deletion task (which may also be referred to as a garbage collection task) is scheduled (e.g., by a database manager). In some examples, the table partitions are deleted in accordance with a partition management schedule (e.g., during a partition management window, during a partition deletion window).

For example, after obtaining a policy file for a table, a migrator may determine a quantity of partitions to retain for the table during operation of the table. If the table includes a quantity of partitions that exceed the quantity of partitions to retain, the migrator may delete the oldest partition, where the age of the oldest partition may be based on a data retention policy of a user and may, thus, include expired data protection metadata. The expired data protection metadata may correspond to user data that is no longer expected to be protected under the data retention policy of the user. In some examples, based on deleing the oldest partition, the migrator may generate a new partition for the table. Additionally, or alternatively, based on deleting the oldest partition, the migrator may generate new buffer partition.

In some examples, the partition deletion operation is robust against failures and can be retried multiple times with little or no effect on the operation of the table. For example, if a migrator fails to delete an expired partition for an expired partitioning interval (e.g., for January), the data protection metadata in the rows of that partitioning interval may remain stored in the table until the expired partition is deleted.

Aspects of the flowchart 300 may be implemented by a controller, among other components. Additionally, or alternatively, aspects of the flowchart 300 may be implemented as instructions stored in memory (e.g., firmware stored in a memory coupled with a controller). For example, the instructions, when executed by a controller, may cause the controller to perform the operations of the flowchart 300.

One or more of the operations described in the flowchart 300 may be performed earlier or later, omitted, replaced, supplemented, or combined with another operation. Also, additional operations described herein may replace, supplement or be combined with one or more of the operations described in the flowchart 300.

Figure 4A:
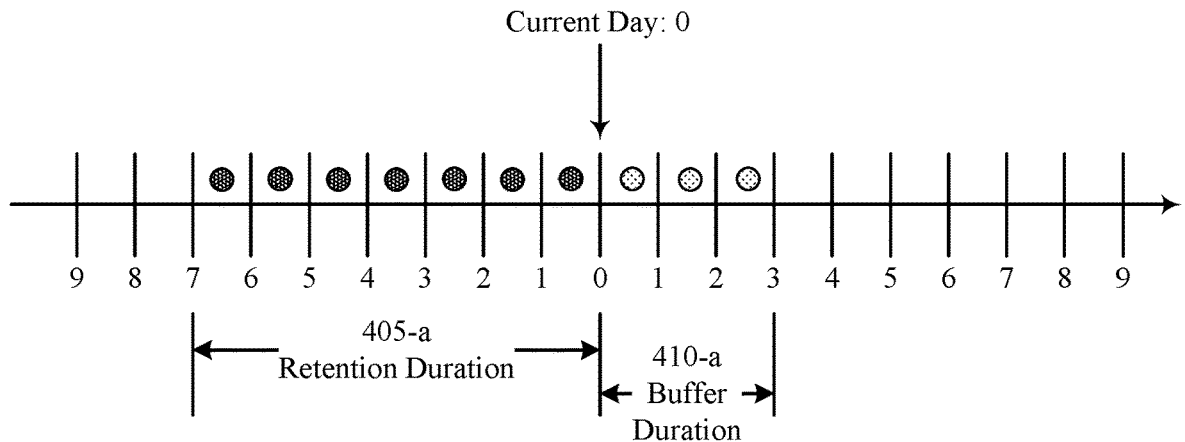
FIGS. 4A and 4B show example of timing diagrams for autonomous table partition management in accordance with aspects of the present disclosure.

FIG. 4A shows an example of a timing diagram for autonomous table partition management in accordance with aspects of the present disclosure.

The timing diagram 400-a shows aspects of a partition management policy for a table in a timeline representation. In the example of FIG. 4A, the timeline units are given in days, though other units may similarly be used.

The timing diagram 400-a shows, on a first day (day 0), the retention duration 405-a during which time data protection metadata is to be retained. For example, in the example of FIG. 4A, a value of a partition interval may indicate one (1) day and a value of a retention unit may indicate seven (7) of the partition intervals (which may correspond to seven days of retention). Accordingly, the retention duration 405-a may be equivalent to seven (7) days. Also, a value of a buffer unit may be set to three (3) of the partition intervals (which may correspond to three days of buffering). Accordingly, the buffer duration 410-a may be equivalent to three (3) days. The partition interval, retention unit, and buffer unit may be included in a table partitioning policy file for the table.

Thus, in accordance with the policy file, the table may include seven (7) partitions and three (3) buffer partitions on day 0. The buffer partitions may be used to store data protection metadata for which values for the partitioning category (e.g., creation time) occur in a future time range not currently covered by the seven (7) partitions. To avoid otherwise storing such data protection metadata in a catch-all partition, this data protection metadata may be stored in a buffer partition assigned a corresponding time range. By not storing this data protection metadata in a catch-all partition, operations for restructuring the table by relocating the data protection metadata in the catch-all partition to the existing partitions may be reduced or avoided.

Figure 4B:
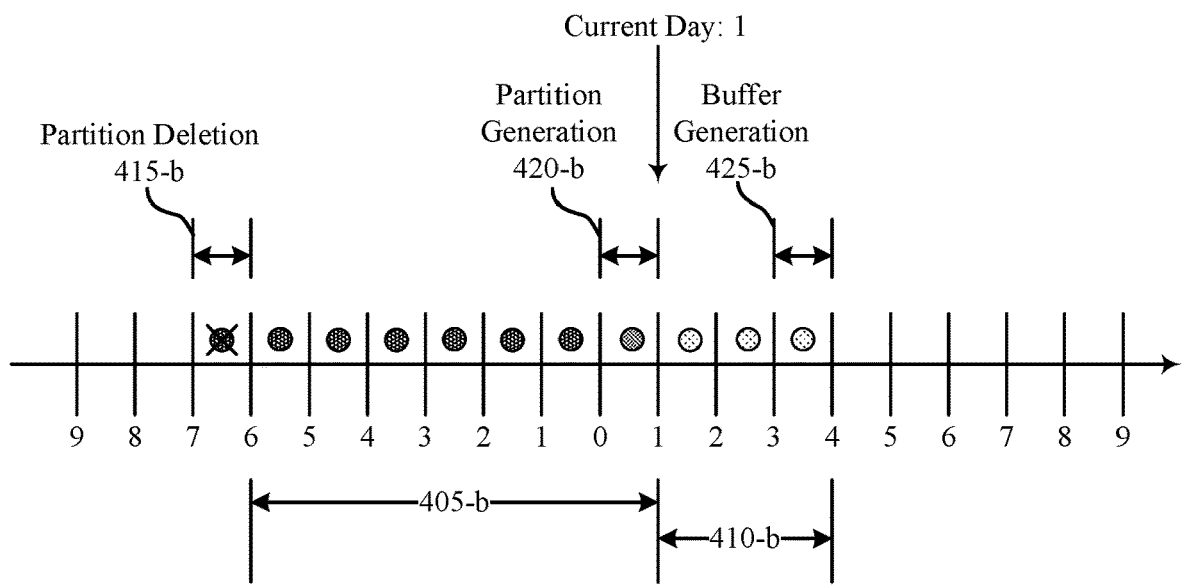

FIG. 4B shows an example of a timing diagram for autonomous table partition management in accordance with aspects of the present disclosure.

The timing diagram 400-b shows the retention duration 405-b and the buffer duration 410-b on a second day (day 1) relative to day 0. The timing diagram 400-b further shows the partition deletion 415-b of an excess partition, the partition generation 420-b of a partition, and the buffer generation 425-b of a buffer partition on day 1.

As shown in the timing diagram 400-b, on day 1, the table may include an excess partition—e.g., the table may include eight partitions and eight days worth of data protection metadata. Accordingly, the excess partition may be deleted as represented by partition deletion 415-b. As described herein, the partitioning parameters (the partition interval, the retention units) may be selected based on a data retention policy for user data that correspond to the table and such that the data protection metadata stored in the excess partition is associated with user data no longer expected to be retained under the data retention policy.

Also, as the current timepoint has moved forward, one of the buffer partitions may no longer exist in advance of a current time point and may, thus, become a partition, as represented by partition generation 420-b. Additionally, as the current timepoint has moved forward, an additional buffer partition may be created as represented by buffer generation 425-b to maintain the designated buffer protection.

Figure 5:
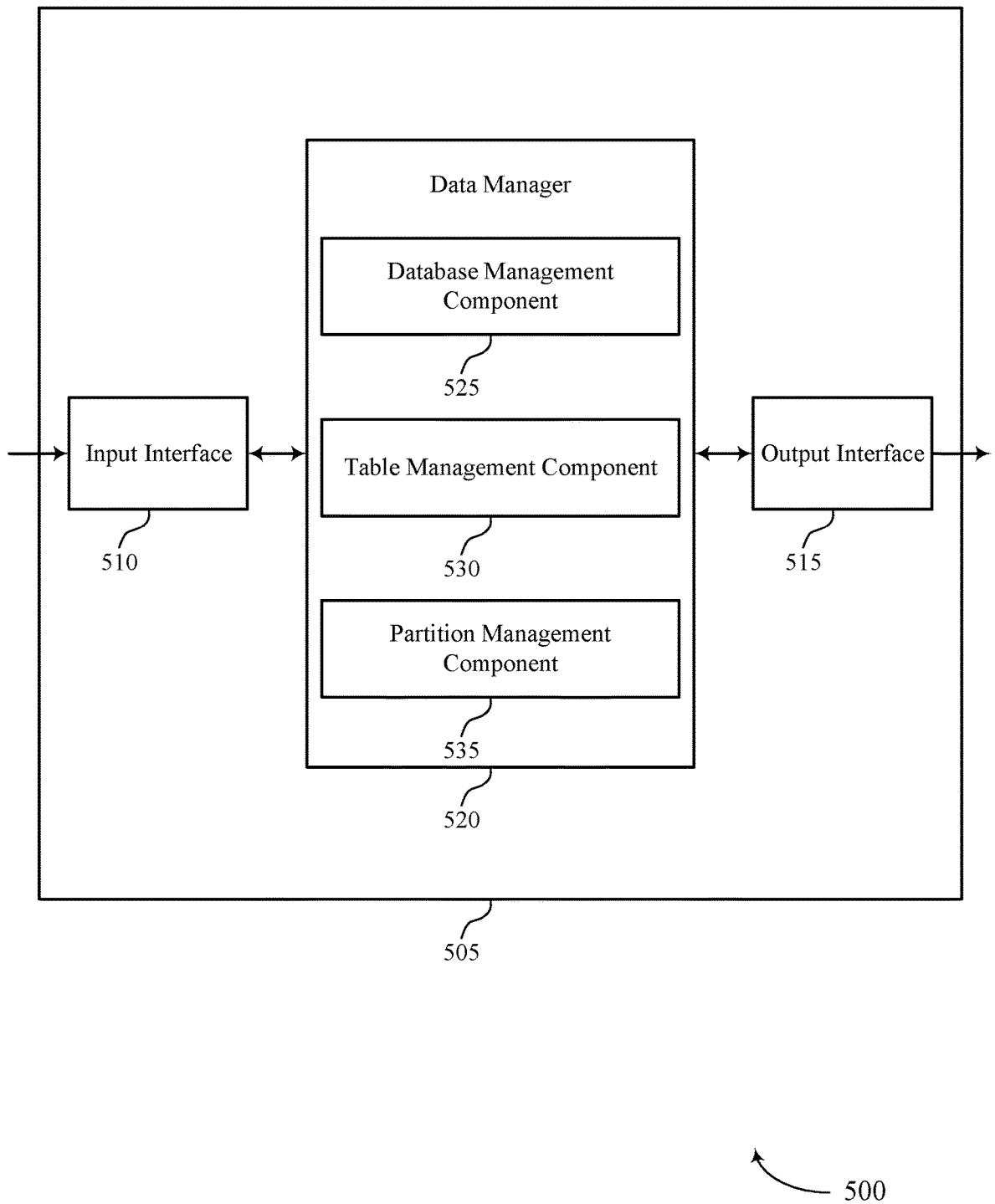
FIG. 5 shows a block diagram of an apparatus that supports autonomous table partition management in accordance with aspects of the present disclosure.

FIG. 5 shows a block diagram 500 of a system 505 that supports autonomous table partition management in accordance with aspects of the present disclosure. In some examples, the system 505 may be an example of aspects of one or more components described with reference to FIG. 1, such as a DMS 110. The system 505 may include an input interface 510, an output interface 515, and a data manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the data manager 520 to support autonomous table partition management. In some cases, the input interface 510 may be a component of a network interface 725 as described with reference to FIG. 7.

The output interface 515 may manage output signaling for the system 505. For example, the output interface 515 may receive signaling from other components of the system 505, such as the data manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the data manager 520 may include a database management component 525, a table management component 530, a partition management component 535, or any combination thereof. In some examples, the data manager 520, or various components thereof, may be configured to perform various operations (e.g., receiving, monitoring, transmitting) using or otherwise in cooperation with the input interface 510, the output interface 515, or both. For example, the data manager 520 may receive information from the input interface 510, send information to the output interface 515, or be integrated in combination with the input interface 510, the output interface 515, or both to receive information, transmit information, or perform various other operations as described herein.

The database management component 525 may be configured as or otherwise support a means for generating, by a data management system, a database instance associated with managing data of a set of multiple users. The table management component 530 may be configured as or otherwise support a means for generating, by the data management system, in the database instance, a table in a database for a user of the set of multiple users, where the table is configured to store metadata for managing data of the user and includes a partitioning category. The partition management component 535 may be configured as or otherwise support a means for identifying, by the data management system, a file that indicates a partition management policy that is based on a data retention policy associated with the data of the user, the partition management policy for partitioning the table and for retaining partitions in the table. The partition management component 535 may be configured as or otherwise support a means for generating, by the data management system, a set of multiple partitions for the table in accordance with the partition management policy indicated by the file and based on the partitioning category. The partition management component 535 may be configured as or otherwise support a means for deleting, by the data management system, after generating the set of multiple partitions, one or more partitions of the set of multiple partitions in accordance with the file.

Figure 6:
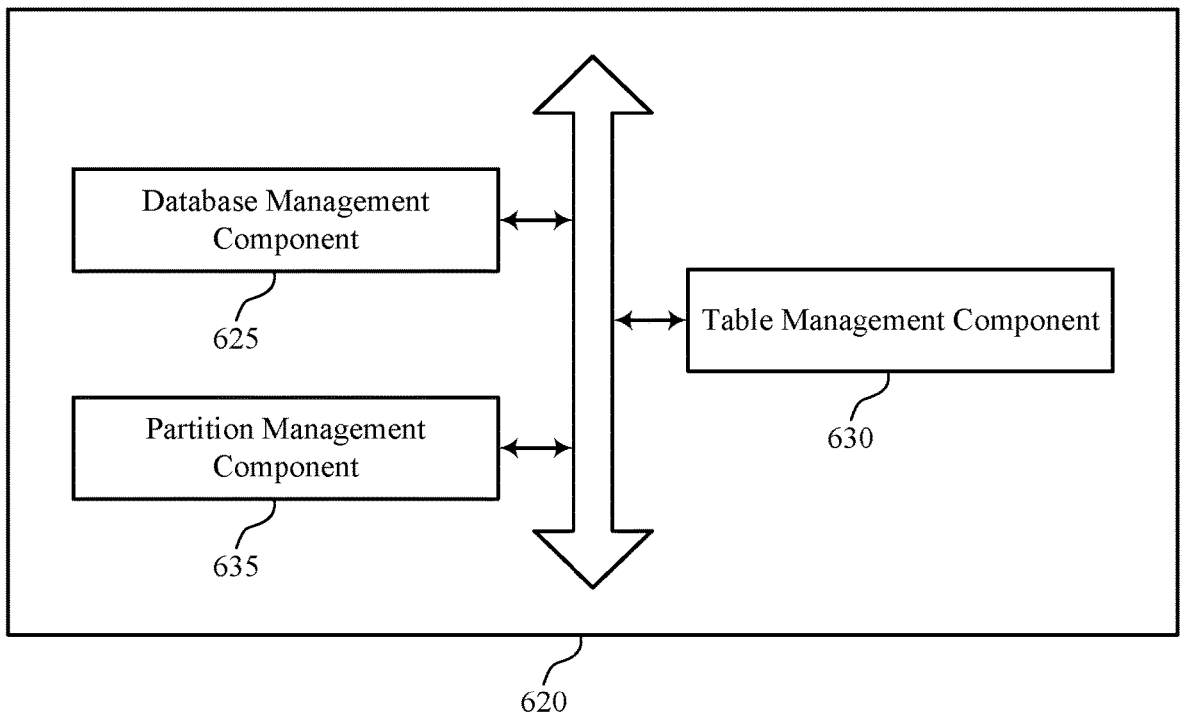
FIG. 6 shows a block diagram of a data manager that supports autonomous table partition management in accordance with aspects of the present disclosure.

FIG. 6 shows a block diagram 600 of a data manager 620 that supports autonomous table partition management in accordance with aspects of the present disclosure. The data manager 620 may be an example of aspects of a data manager or a data manager 520, or both, as described herein. The data manager 620, or various components thereof, may be an example of means for performing various aspects of autonomous table partition management as described herein. For example, the data manager 620 may include a database management component 625, a table management component 630, a partition management component 635, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The database management component 625 may be configured as or otherwise support a means for generating, by a data management system, a database instance associated with managing data of a set of multiple users. The table management component 630 may be configured as or otherwise support a means for generating, by the data management system, in the database instance, a table in a database for a user of the set of multiple users, where the table is configured to store metadata for managing data of the user and includes a partitioning category. The partition management component 635 may be configured as or otherwise support a means for identifying, by the data management system, a file that indicates a partition management policy that is based on a data retention policy associated with the data of the user, the partition management policy for partitioning the table and for retaining partitions in the table. In some examples, the partition management component 635 may be configured as or otherwise support a means for generating, by the data management system, a set of multiple partitions for the table in accordance with the partition management policy indicated by the file and based on the partitioning category. In some examples, the partition management component 635 may be configured as or otherwise support a means for deleting, by the data management system, after generating the set of multiple partitions, one or more partitions of the set of multiple partitions in accordance with the file.

In some examples, the partition management component 635 may be configured as or otherwise support a means for selecting, based on generating the table, the partitioning category for the table, where the partitioning category is selected based on the data retention policy associated with the data of the user.

In some examples, the partitioning category is a time-based category. In some examples, an adherence with the data retention policy associated with the data of the user is determinable based on the time-based category.

In some examples, the partitioning category is a non-time-based category.

In some examples, the partition management component 635 may be configured as or otherwise support a means for obtaining, from the file, a time interval for partitions of the table and a quantity of partitions of the table to retain during operation of the table, where a duration of the time interval and a value for the quantity of partitions of the table to retain are based on a duration for retaining captured versions of the data of the user that is determined from the data retention policy.

In some examples, the set of multiple partitions is generated based on a time interval for partitions of the table, a quantity of partitions to retain during operation of the table, and the partitioning category.

In some examples, generating the set of multiple partitions includes assigning respective time ranges to the set of multiple partitions in accordance with a time interval for partitions of the table indicated in the file; and storing rows of the table in the set of multiple partitions based on respective values, for the rows, of the partitioning category.

In some examples, storing the rows of the table in the set of multiple partitions includes identifying a row included in the rows of the table; determining, for the row, a respective value of the partitioning category; identifying, from among the respective time ranges, a time range that includes the respective value of the partitioning category for the row; and storing the row in a partition of the set of multiple partitions that has been assigned the time range identified as including the value of the partitioning category for the row.

In some examples, the partition management component 635 may be configured as or otherwise support a means for determining, based on identifying the file, a quantity of partitions to retain from the file. In some examples, the partition management component 635 may be configured as or otherwise support a means for determining, based on generating the set of multiple partitions, that at least a subset of the generated set of multiple partitions exceeds the quantity of partitions to retain, where the one or more partitions of the set of multiple partitions are deleted based on the quantity of the generated set of multiple partitions exceeding the quantity of partitions to retain.

In some examples, determining that at least the subset of the generated plurality of partitions exceeds the quantity of partitions to retain comprises determining that, within the generated plurality of partitions, a quantity of partitions having data from one or more prior time periods exceeds the quantity of partitions to retain, and the one or more partitions that are deleted are associated with one or more captured versions of the data of the user for which a retention duration associated with the data retention policy has expired.

In some examples, the partition management component 635 may be configured as or otherwise support a means for performing, based on generating the set of multiple partitions, an operation for deleting the one or more partitions of the set of multiple partitions. In some examples, the partition management component 635 may be configured as or otherwise support a means for determining, based on the performing, a failure of the operation. In some examples, the partition management component 635 may be configured as or otherwise support a means for retrying, based on determining the failure of the operation, the operation for deleting the one or more partitions of the set of multiple partitions until the one or more partitions of the set of multiple partitions are deleted.

In some examples, the partition management component 635 may be configured as or otherwise support a means for performing, based on generating the set of multiple partitions, for a first time, an operation for generating a partition of the set of multiple partitions. In some examples, the partition management component 635 may be configured as or otherwise support a means for determining, based on the performing, a failure of the operation. In some examples, the partition management component 635 may be configured as or otherwise support a means for retrying, based on determining the failure of the operation, the operation for deleting the one or more partitions of the set of multiple partitions until the partition is generated.

In some examples, the partition management component 635 may be configured as or otherwise support a means for generating, based on generating the set of multiple partitions, one or more buffer partitions ahead of a schedule indicated by the partition management policy.

In some examples, the partition management component 635 may be configured as or otherwise support a means for identifying a set of multiple files that indicate a set of multiple partition management policies for a set of multiple tables, the set of multiple partition management policies for partitioning the set of multiple tables and for retaining partitions in the set of multiple tables based on respective data retention policies associated with respective tables of the set of multiple tables. In some examples, the database management component 625 may be configured as or otherwise support a means for initiating a set of multiple computing threads associated with generating and deleting partitions in the set of multiple tables.

In some examples, generating the database instance includes generating a set of multiple databases associated with managing the data of the set of multiple users, the set of multiple databases including the database; identifying a set of multiple files that indicate a set of multiple partition management policies for a set of multiple tables across the set of multiple databases, the set of multiple partition management policies for partitioning the set of multiple tables across the set of multiple databases and for retaining partitions in the set of multiple tables based on respective data retention policies associated with respective tables of the set of multiple tables; and initiating a set of multiple computing threads associated with generating and deleting partitions in the set of multiple tables across the set of multiple databases.

In some examples, the database management component 625 may be configured as or otherwise support a means for modifying, based on initiating the set of multiple computing threads, a quantity of the set of multiple computing threads based on a duration (e.g., a target duration) for completing an operation for generating and deleting the partitions in the set of multiple tables.

In some examples, the partition management component 635 may be configured as or otherwise support a means for generating a catch-all partition for the table, where the catch-all partition is configured to store rows of the table not stored in the set of multiple partitions in accordance with the file.

In some examples, the data retention policy associated with the data of the user indicates one or more time windows for retaining captured versions of the data of the user, one or more quantities of captured versions of the data of the user to retain, or a combination thereof.

Figure 7:
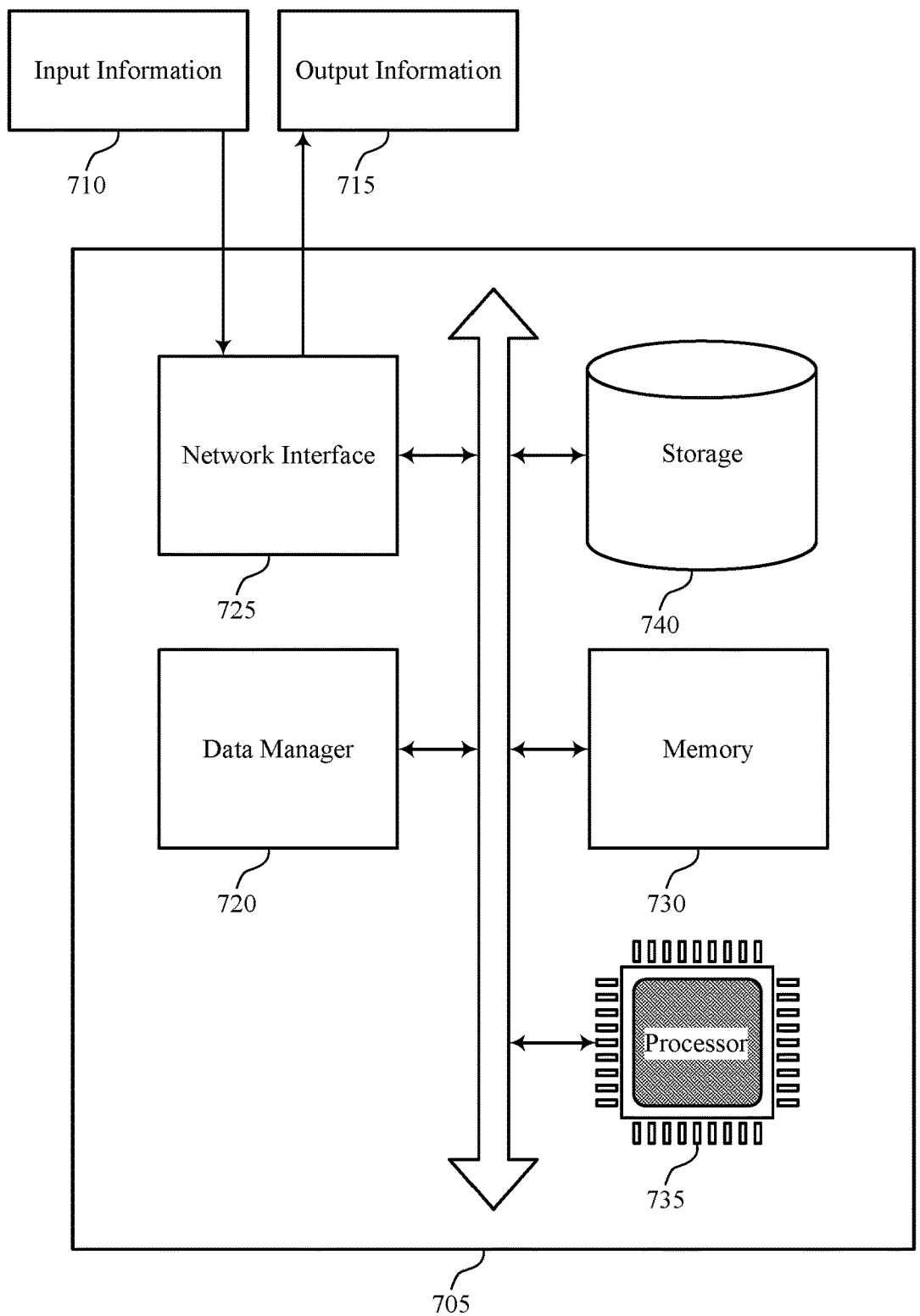
FIG. 7 shows a diagram of a system including a device that supports autonomous table partition management in accordance with aspects of the present disclosure.

FIG. 7 shows a block diagram 700 of a system 705 that supports autonomous table partition management in accordance with aspects of the present disclosure. The system 705 may be an example of or include the components of a system 505 as described herein. The system 705 may include components for data management, including components such as a data manager 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting autonomous table partition management). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the data manager 720 may be configured as or otherwise support a means for generating, by a data management system, a database instance associated with managing data of a set of multiple users. The data manager 720 may be configured as or otherwise support a means for generating, by the data management system, in the database instance, a table in a database for a user of the set of multiple users, where the table is configured to store metadata for managing data of the user and includes a partitioning category. The data manager 720 may be configured as or otherwise support a means for identifying, by the data management system, a file that indicates a partition management policy that is based on a data retention policy associated with the data of the user, the partition management policy for partitioning the table and for retaining partitions in the table. The data manager 720 may be configured as or otherwise support a means for generating, by the data management system, a set of multiple partitions for the table in accordance with the partition management policy indicated by the file and based on the partitioning category. The data manager 720 may be configured as or otherwise support a means for deleting, by the data management system, after generating the set of multiple partitions, one or more partitions of the set of multiple partitions in accordance with the file.

By including or configuring the data manager 720 in accordance with examples as described herein, the system 705 may support techniques for autonomous table partition management, which may provide one or more benefits such as, for example, enabling autonomous deletion of expired data in one or more databases in accordance with a declared policy file, among other possibilities.

Figure 8:
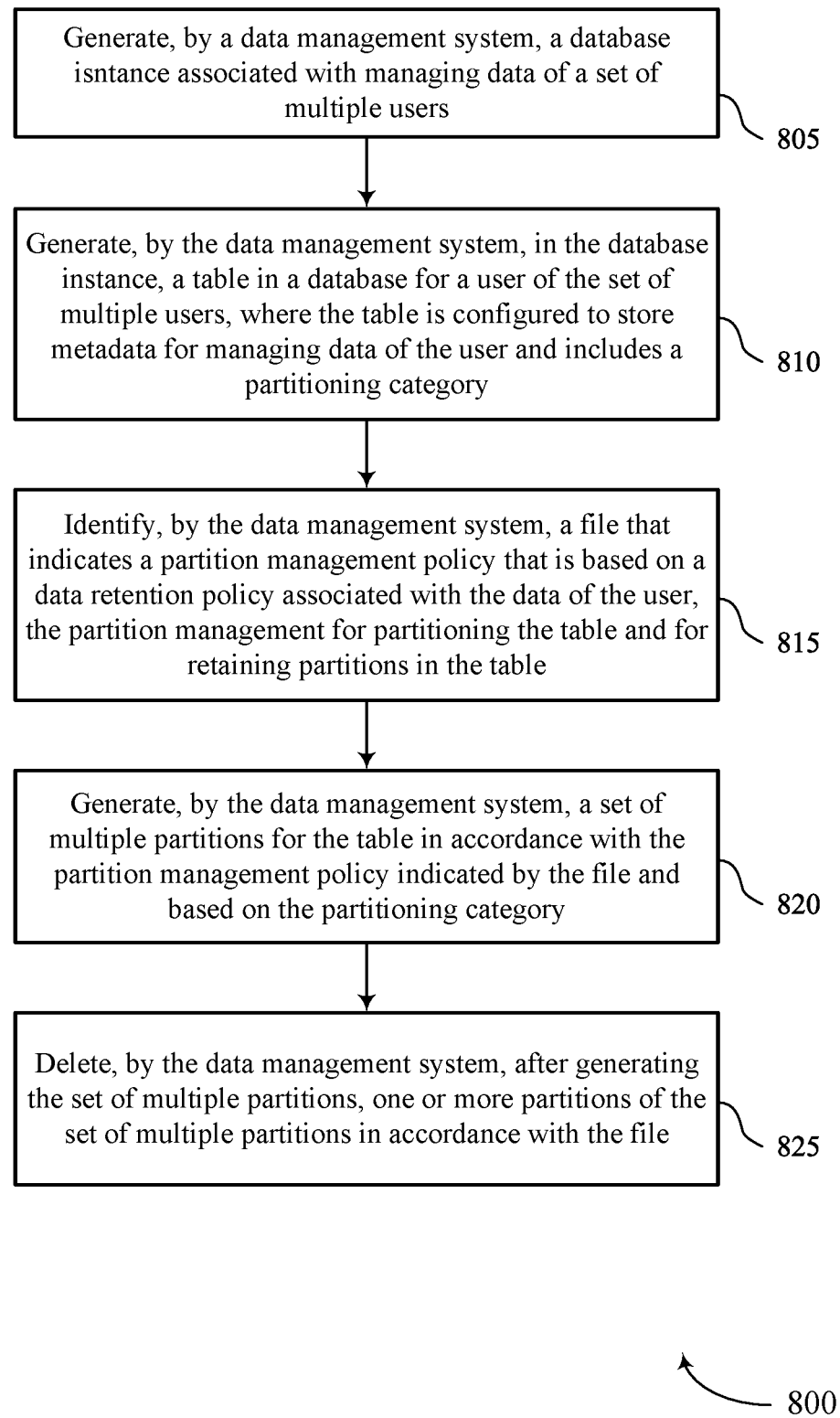
FIG. 8 shows a flowchart illustrating methods that support autonomous table partition management in accordance with aspects of the present disclosure.

FIG. 8 shows a flowchart illustrating a method 800 that supports autonomous table partition management in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include generating, by a data management system, a database instance associated with managing data of a set of multiple users. The operations of block 805 may be performed in accordance with examples as disclosed herein. In some examples, aspects of the operations of 805 may be performed by a database management component 625 as described with reference to FIG. 6.

At 810, the method may include generating, by the data management system, in the database instance, a table in a database for a user of the set of multiple users, where the table is configured to store metadata for managing data of the user and includes a partitioning category. The operations of block 810 may be performed in accordance with examples as disclosed herein. In some examples, aspects of the operations of 810 may be performed by a table management component 630 as described with reference to FIG. 6.

At 815, the method may include identifying, by the data management system, a file that indicates a partition management policy that is based on a data retention policy associated with the data of the user, the partition management policy for partitioning the table and for retaining partitions in the table. The operations of block 815 may be performed in accordance with examples as disclosed herein. In some examples, aspects of the operations of 815 may be performed by a partition management component 635 as described with reference to FIG. 6.

At 820, the method may include generating, by the data management system, a set of multiple partitions for the table in accordance with the partition management policy indicated by the file and based on the partitioning category. The operations of block 820 may be performed in accordance with examples as disclosed herein. In some examples, aspects of the operations of 820 may be performed by a partition management component 635 as described with reference to FIG. 6.

At 825, the method may include deleting, by the data management system, after generating the set of multiple partitions, one or more partitions of the set of multiple partitions in accordance with the file. The operations of block 825 may be performed in accordance with examples as disclosed herein. In some examples, aspects of the operations of 825 may be performed by a partition management component 635 as described with reference to FIG. 6.

A method is described. The method may include generating, by a data management system, a database instance associated with managing data of a set of multiple users, generating, by the data management system, in the database instance, a table in a database for a user of the set of multiple users, where the table is configured to store metadata for managing data of the user and includes a partitioning category, identifying, by the data management system, a file that indicates a partition management policy that is based on a data retention policy associated with the data of the user, the partition management policy for partitioning the table and for retaining partitions in the table, generating, by the data management system, a set of multiple partitions for the table in accordance with the partition management policy indicated by the file and based on the partitioning category, and deleting, by the data management system, after generating the set of multiple partitions, one or more partitions of the set of multiple partitions in accordance with the file.

An apparatus is described. The apparatus may include at least one processor, at least one memory coupled with the at least one processor, and instructions stored in the at least one memory. The instructions may be executable by the at least one processor to cause the apparatus to generate, by a data management system, a database instance associated with managing data of a set of multiple users, generate, by the data management system, in the database instance, a table in a database for a user of the set of multiple users, where the table is configured to store metadata for managing data of the user and includes a partitioning category, identify, by the data management system, a file that indicates a partition management policy that is based on a data retention policy associated with the data of the user, the partition management policy for partitioning the table and for retaining partitions in the table, generate, by the data management system, a set of multiple partitions for the table in accordance with the partition management policy indicated by the file and based on the partitioning category, and delete, by the data management system, after generating the set of multiple partitions, one or more partitions of the set of multiple partitions in accordance with the file.

Another apparatus is described. The apparatus may include means for generating, by a data management system, a database instance associated with managing data of a set of multiple users, means for generating, by the data management system, in the database instance, a table in a database for a user of the set of multiple users, where the table is configured to store metadata for managing data of the user and includes a partitioning category, means for identifying, by the data management system, a file that indicates a partition management policy that is based on a data retention policy associated with the data of the user, the partition management policy for partitioning the table and for retaining partitions in the table, means for generating, by the data management system, a set of multiple partitions for the table in accordance with the partition management policy indicated by the file and based on the partitioning category, and means for deleting, by the data management system, after generating the set of multiple partitions, one or more partitions of the set of multiple partitions in accordance with the file.

A non-transitory computer-readable medium storing code is described. The code may include instructions executable by a processor to generate, by a data management system, a database instance associated with managing data of a set of multiple users, generate, by the data management system, in the database instance, a table in a database for a user of the set of multiple users, where the table is configured to store metadata for managing data of the user and includes a partitioning category, identify, by the data management system, a file that indicates a partition management policy that is based on a data retention policy associated with the data of the user, the partition management policy for partitioning the table and for retaining partitions in the table, generate, by the data management system, a set of multiple partitions for the table in accordance with the partition management policy indicated by the file and based on the partitioning category, and delete, by the data management system, after generating the set of multiple partitions, one or more partitions of the set of multiple partitions in accordance with the file.

Some examples of the method, apparatuses, and non-transitory computer-readable medium described herein may further include operations, features, means, or instructions for selecting, based on generating the table, the partitioning category for the table, where the partitioning category may be selected based on the data retention policy associated with the data of the user.

In some examples of the method, apparatuses, and non-transitory computer-readable medium described herein, the partitioning category may be a time-based category and an adherence with the data retention policy associated with the data of the user may be determinable based on the time-based category.

In some examples of the method, apparatuses, and non-transitory computer-readable medium described herein, the partitioning category may be a non-time-based category.

Some examples of the method, apparatuses, and non-transitory computer-readable medium described herein may further include operations, features, means, or instructions for obtaining, from the file, a time interval for partitions of the table and a quantity of partitions of the table to retain during operation of the table, where a duration of the time interval and a value for the quantity of partitions of the table to retain may be based on a duration for retaining captured versions of the data of the user that may be determined from the data retention policy.

In some examples of the method, apparatuses, and non-transitory computer-readable medium described herein, the set of multiple partitions may be generated based on a time interval for partitions of the table, a quantity of partitions to retain during operation of the table, and the partitioning category.

Some examples of the method, apparatuses, and non-transitory computer-readable medium described herein may further include operations, features, means, or instructions for generating the set of multiple partitions includes assigning respective time ranges to the set of multiple partitions in accordance with a time interval for partitions of the table indicated in the file; and storing rows of the table in the set of multiple partitions based on respective values, for the rows, of the partitioning category.

Some examples of the method, apparatuses, and non-transitory computer-readable medium described herein may further include operations, features, means, or instructions for storing the rows of the table in the set of multiple partitions includes identifying a row included in the rows of the table; determining, for the row, a respective value of the partitioning category; identifying, from among the respective time ranges, a time range that includes the respective value of the partitioning category for the row; and storing the row in a partition of the set of multiple partitions that may have been assigned the time range identified as including the value of the partitioning category for the row.

Some examples of the method, apparatuses, and non-transitory computer-readable medium described herein may further include operations, features, means, or instructions for determining, based on identifying the file, a quantity of partitions to retain from the file and determining, based on generating the set of multiple partitions, that at least a subset of the generated set of multiple partitions exceeds the quantity of partitions to retain, where the one or more partitions of the set of multiple partitions may be deleted based on the quantity of the generated set of multiple partitions exceeding the quantity of partitions to retain.

In some examples of the method, apparatuses, and non-transitory computer-readable medium described herein, determining that at least the subset of the generated plurality of partitions exceeds the quantity of partitions to retain comprises determining that, within the generated plurality of partitions, a quantity of partitions having data from one or more prior time periods exceeds the quantity of partitions to retain, and the one or more partitions that may be deleted may be associated with one or more captured versions of the data of the user for which a retention duration associated with the data retention policy may have expired.

Some examples of the method, apparatuses, and non-transitory computer-readable medium described herein may further include operations, features, means, or instructions for performing, based on generating the set of multiple partitions, an operation for deleting the one or more partitions of the set of multiple partitions, determining, based on the performing, a failure of the operation, and retrying, based on determining the failure of the operation, the operation for deleting the one or more partitions of the set of multiple partitions until the one or more partitions of the set of multiple partitions may be deleted.

Some examples of the method, apparatuses, and non-transitory computer-readable medium described herein may further include operations, features, means, or instructions for performing, based on generating the set of multiple partitions, for a first time, an operation for generating a partition of the set of multiple partitions, determining, based on the performing, a failure of the operation, and retrying, based on determining the failure of the operation, the operation for deleting the one or more partitions of the set of multiple partitions until the partition may be generated.

Some examples of the method, apparatuses, and non-transitory computer-readable medium described herein may further include operations, features, means, or instructions for generating, based on generating the set of multiple partitions, one or more buffer partitions ahead of a schedule indicated by the partition management policy.

Some examples of the method, apparatuses, and non-transitory computer-readable medium described herein may further include operations, features, means, or instructions for identifying a set of multiple files that indicate a set of multiple partition management policies for a set of multiple tables, the set of multiple partition management policies for partitioning the set of multiple tables and for retaining partitions in the set of multiple tables based on respective data retention policies associated with respective tables of the set of multiple tables and initiating a set of multiple computing threads associated with generating and deleting partitions in the set of multiple tables.

Some examples of the method, apparatuses, and non-transitory computer-readable medium described herein may further include operations, features, means, or instructions for generating the database instance includes generating a set of multiple databases associated with managing the data of the set of multiple users, the set of multiple databases including the database; identifying a set of multiple files that indicate a set of multiple partition management policies for a set of multiple tables across the set of multiple databases, the set of multiple partition management policies for partitioning the set of multiple tables across the set of multiple databases and for retaining partitions in the set of multiple tables based on respective data retention policies associated with respective tables of the set of multiple tables; and initiating a set of multiple computing threads associated with generating and deleting partitions in the set of multiple tables across the set of multiple databases.

Some examples of the method, apparatuses, and non-transitory computer-readable medium described herein may further include operations, features, means, or instructions for modifying, based on initiating the set of multiple computing threads, a quantity of the set of multiple computing threads based on a duration (e.g., a target duration) for completing an operation for generating and deleting the partitions in the set of multiple tables.

Some examples of the method, apparatuses, and non-transitory computer-readable medium described herein may further include operations, features, means, or instructions for generating a catch-all partition for the table, where the catch-all partition may be configured to store rows of the table not stored in the set of multiple partitions in accordance with the file.

In some examples of the method, apparatuses, and non-transitory computer-readable medium described herein, the data retention policy associated with the data of the user indicates one or more time windows for retaining captured versions of the data of the user, one or more quantities of captured versions of the data of the user to retain, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Also, as used herein, including in the claims, "or" as used in a list of items (for example, a list of items prefaced by a phrase such as "at least one of" or "one or more of")

indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   generating, by a data management system, a database instance associated with managing data of a plurality of users;
   generating, by the data management system, in the database instance, a table in a database for a user of the plurality of users, wherein the table is configured to store metadata for managing data of the user and comprises a partitioning category;
   identifying, by the data management system, a file that indicates a partition management policy that is based at least in part on a data retention policy associated with the data of the user, the partition management policy for partitioning the table and for retaining partitions in the table;
   determining, based at least in part on identifying the file, a quantity of partitions to retain from the file;
   generating, by the data management system, a plurality of partitions for the table in accordance with the partition management policy indicated by the file and based at least in part on the partitioning category;
   determining, based at least in part on generating the plurality of partitions, that at least a subset of the generated plurality of partitions exceeds the quantity of partitions to retain; and
   deleting, by the data management system, after generating the plurality of partitions, one or more partitions of the plurality of partitions in accordance with the file and based at least in part on the quantity of the generated plurality of partitions exceeding the quantity of partitions to retain.

2. The method of claim 1, further comprising:
   selecting, based at least in part on generating the table, the partitioning category for the table, wherein the partitioning category is selected based at least in part on the data retention policy associated with the data of the user.

3. The method of claim 2, wherein the partitioning category is a time-based category, and wherein an adherence with the data retention policy associated with the data of the user is determinable based at least in part on the time-based category.

4. The method of claim 2, wherein the partitioning category is a non-time-based category.

5. The method of claim 1, further comprising:
   obtaining, from the file, a time interval for partitions of the table and a quantity of partitions of the table to retain during operation of the table, wherein a duration of the time interval and a value for the quantity of partitions of the table to retain are based at least in part on a duration for retaining captured versions of the data of the user that is determined from the data retention policy.

6. The method of claim 1, wherein the plurality of partitions is generated based at least in part on a time interval for partitions of the table, a quantity of partitions to retain during operation of the table, and the partitioning category.

7. The method of claim 1, wherein generating the plurality of partitions comprises:
   assigning respective time ranges to the plurality of partitions in accordance with a time interval for partitions of the table indicated in the file; and
   storing rows of the table in the plurality of partitions based at least in part on respective values, for the rows, of the partitioning category.

8. The method of claim 7, wherein storing the rows of the table in the plurality of partitions comprises:
   identifying a row included in the rows of the table;
   determining, for the row, a respective value of the partitioning category;
   identifying, from among the respective time ranges, a time range that includes the respective value of the partitioning category for the row; and
   storing the row in a partition of the plurality of partitions that has been assigned the time range identified as including the respective value of the partitioning category for the row.

9. The method of claim 1, wherein:
   determining that at least the subset of the generated plurality of partitions exceeds the quantity of partitions to retain comprises determining that, within the generated plurality of partitions, a quantity of partitions having data from one or more prior time periods exceeds the quantity of partitions to retain, and
   the one or more partitions that are deleted are associated with one or more captured versions of the data of the user for which a retention duration associated with the data retention policy has expired.

10. The method of claim 1, further comprising:
performing, based at least in part on generating the plurality of partitions, an operation for deleting the one or more partitions of the plurality of partitions;
determining, based at least in part on the performing, a failure of the operation; and
retrying, based at least in part on determining the failure of the operation, the operation for deleting the one or more partitions of the plurality of partitions until the one or more partitions of the plurality of partitions are deleted.

11. The method of claim 1, further comprising:
performing, based at least in part on generating the plurality of partitions, for a first time, an operation for generating a partition of the plurality of partitions;
determining, based at least in part on the performing, a failure of the operation; and
retrying, based at least in part on determining the failure of the operation, the operation for deleting the one or more partitions of the plurality of partitions until the partition is generated.

12. The method of claim 1, further comprising:
generating, based at least in part on generating the plurality of partitions, one or more buffer partitions ahead of a schedule indicated by the partition management policy.

13. The method of claim 1, further comprising:
identifying a plurality of files that indicate a plurality of partition management policies for a plurality of tables, the plurality of partition management policies for partitioning the plurality of tables and for retaining partitions in the plurality of tables based at least in part on respective data retention policies associated with respective tables of the plurality of tables; and
initiating a plurality of computing threads associated with generating and deleting partitions in the plurality of tables.

14. The method of claim 1, wherein generating the database instance comprises:
generating a plurality of databases associated with managing the data of the plurality of users, the plurality of databases comprising the database;
identifying a plurality of files that indicate a plurality of partition management policies for a plurality of tables across the plurality of databases, the plurality of partition management policies for partitioning the plurality of tables across the plurality of databases and for retaining partitions in the plurality of tables based at least in part on respective data retention policies associated with respective tables of the plurality of tables; and
initiating a plurality of computing threads associated with generating and deleting partitions in the plurality of tables across the plurality of databases.

15. The method of claim 14, further comprising:
modifying, based at least in part on initiating the plurality of computing threads, a quantity of the plurality of computing threads based at least in part on a duration for completing an operation for generating and deleting the partitions in the plurality of tables.

16. The method of claim 1, further comprising:
generating a catch-all partition for the table, wherein the catch-all partition is configured to store rows of the table not stored in the plurality of partitions in accordance with the file.

17. The method of claim 1, wherein the data retention policy associated with the data of the user indicates one or more time windows for retaining captured versions of the data of the user, one or more quantities of captured versions of the data of the user to retain, or a combination thereof.

18. An apparatus, comprising:
memory; and
at least one processor coupled with the memory, wherein instructions stored in the memory are executable by the at least one processor to cause the apparatus to:
generate, by a data management system, a database instance associated with managing data of a plurality of users;
generate, by the data management system, in the database instance, a table in a database for a user of the plurality of users, wherein the table is configured to store metadata for managing data of the user and comprises a partitioning category;
identify, by the data management system, a file that indicates a partition management policy that is based at least in part on a data retention policy associated with the data of the user, the partition management policy for partitioning the table and for retaining partitions in the table;
determine, based at least in part on identifying the file, a quantity of partitions to retain from the file;
generate, by the data management system, a plurality of partitions for the table in accordance with the partition management policy indicated by the file and based at least in part on the partitioning category;
determine, based at least in part on generating the plurality of partitions, that at least a subset of the generated plurality of partitions exceeds the quantity of partitions to retain; and
delete, by the data management system, after generating the plurality of partitions, one or more partitions of the plurality of partitions in accordance with the file and based at least in part on the quantity of the generated plurality of partitions exceeding the quantity of partitions to retain.

19. A non-transitory, computer-readable medium storing code comprising instructions that are executable by at least one processor of at least one device to cause the at least one device to:
generate, by a data management system, a database instance associated with managing data of a plurality of users;
generate, by the data management system, in the database instance, a table in a database for a user of the plurality of users, wherein the table is configured to store metadata for managing data of the user and comprises a partitioning category;
identify, by the data management system, a file that indicates a partition management policy that is based at least in part on a data retention policy associated with the data of the user, the partition management policy for partitioning the table and for retaining partitions in the table;
determine, based at least in part on identifying the file, a quantity of partitions to retain from the file;
generate, by the data management system, a plurality of partitions for the table in accordance with the partition management policy indicated by the file and based at least in part on the partitioning category;

determine, based at least in part on generating the plurality of partitions, that at least a subset of the generated plurality of partitions exceeds the quantity of partitions to retain; and delete, by the data management system, after generating the plurality of partitions, one or more partitions of the plurality of partitions in accordance with the file and based at least in part on the quantity of the generated plurality of partitions exceeding the quantity of partitions to retain.

* * * * *